United States Patent
Matsuki

(10) Patent No.: US 11,400,898 B2
(45) Date of Patent: Aug. 2, 2022

(54) DOLLY

(71) Applicant: KABUSHIKI KAISHA TOYOTA JIDOSHOKKI, Aichi-ken (JP)

(72) Inventor: Takanori Matsuki, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 16/932,297

(22) Filed: Jul. 17, 2020

(65) Prior Publication Data

US 2021/0024046 A1 Jan. 28, 2021

(30) Foreign Application Priority Data

Jul. 24, 2019 (JP) .............................. JP2019-136204

(51) Int. Cl.
*B60T 7/20* (2006.01)
*B60T 1/04* (2006.01)
*B60D 1/24* (2006.01)
*B60D 1/145* (2006.01)
*B60T 11/04* (2006.01)

(52) U.S. Cl.
CPC ................ *B60T 7/20* (2013.01); *B60D 1/145* (2013.01); *B60D 1/242* (2013.01); *B60T 1/04* (2013.01); *B60T 11/04* (2013.01)

(58) Field of Classification Search
CPC .......... B60T 7/20; B60T 11/04; B60T 11/043; B60D 1/02; B60D 1/025; B60D 1/242
USPC ................ 188/3 R, 9, 19, 166, 167
See application file for complete search history.

(56) References Cited

U.S. PATENT DOCUMENTS

| 2,198,159 | A | * | 4/1940 | Foley | .......................... B60T 7/20 188/112 R |
| 2,253,791 | A | * | 8/1941 | Kline | .......................... B62B 5/04 188/119 |
| 2,853,317 | A | * | 9/1958 | Waddle | ................... B60D 1/065 280/511 |
| 3,161,422 | A | * | 12/1964 | Wade | ........................ B60D 1/02 280/508 |
| 3,921,766 | A | * | 11/1975 | May | ........................ B60T 13/04 188/167 |
| 4,453,620 | A | * | 6/1984 | Angus | ........................ B60T 7/20 188/112 R |
| 9,180,846 | B2 | * | 11/2015 | Mercure | ................. B60D 1/242 |
| 9,744,955 | B1 | | 8/2017 | Hoeper et al. | |
| 2011/0303502 | A1 | * | 12/2011 | Mercure | .................... B60T 7/20 188/2 D |

FOREIGN PATENT DOCUMENTS

| DE | 4124974 A1 | 1/1993 |
| WO | WO97/38880 A1 | 10/1997 |

* cited by examiner

*Primary Examiner* — Thomas J Williams
(74) *Attorney, Agent, or Firm* — Greenblum & Bernstein, P.L.C.

(57) ABSTRACT

When a drawbar is inserted into a coupling hole, which is a necessary task to couple a towbar to a tractor, a brake device switches from a braking state in which a braking force is applied to each front wheel to a non-braking state in which the front wheel is released from the braking force. When the drawbar is removed from the coupling hole, which is a necessary task to uncouple the tractor from the towbar, the brake device switches from the non-braking state to the braking state.

3 Claims, 7 Drawing Sheets

DOLLY

BACKGROUND

1. Field

The following description relates to a dolly configured to be towed by a tractor.

2. Description of Related Art

For example, U.S. Pat. No. 9,744,955 discloses a dolly that includes a towbar having a coupling hole into which a drawbar of a tractor is inserted. When the drawbar is inserted into the coupling hole of the towbar, the towbar is coupled to the tractor via the drawbar. Thus, the dolly is towed by the tractor. The dolly disclosed in U.S. Pat. No. 9,744,955 is provided with a brake device that switches between a braking state and a non-braking state in coordination with movement of the towbar. In the braking state, a braking force is applied to a wheel. In the non-braking state, the wheel is released from the braking force.

However, the dolly disclosed in U.S. Pat. No. 9,744,955 needs the towbar to be manually operated to switch the brake device between the braking state and the non-braking state. This adversely affects the work efficiency.

SUMMARY

It is an objective of the present disclosure to provide a dolly that improves the work efficiency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To achieve the foregoing objective, a first aspect of the present disclosure provides a dolly configured to be towed by a tractor. The dolly includes a wheel, a brake device that applies a braking force to the wheel, and a towbar including a coupling hole into which a drawbar of the tractor is inserted. When the drawbar is inserted into the coupling hole, the dolly is coupled to the tractor via the towbar and the drawbar. The brake device is configured to switch from a braking state in which a braking force is applied to the wheel to a non-braking state in which the wheel is released from the braking force when the drawbar is inserted into the coupling hole, and to switch from the non-braking state to the braking state when the drawbar is removed from the coupling hole.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a dolly will now be described in accordance with FIGS. 1 to 10. The dolly of the present embodiment is towed by a tractor. In the description hereafter, the terms, up, down, left, right, front, and rear are defined as shown in FIGS. 1 to 10.

Figure 1:
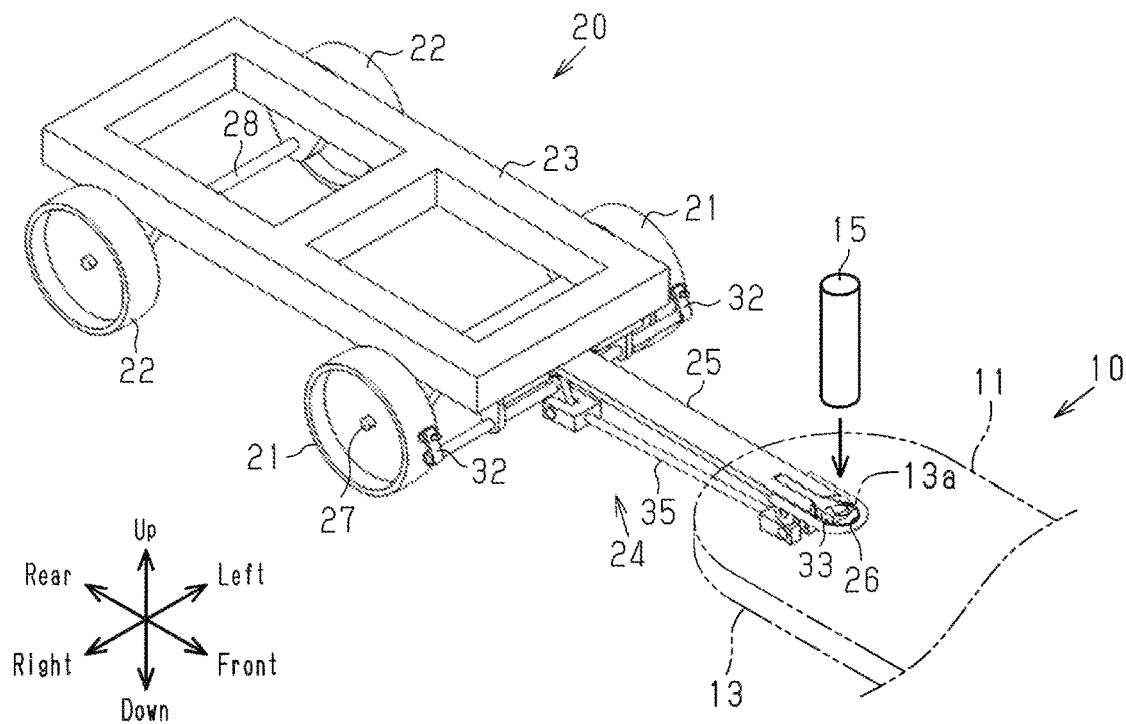
FIG. 1 is a perspective view showing portions of a first embodiment that couple a dolly and a tractor.
Figure 2:
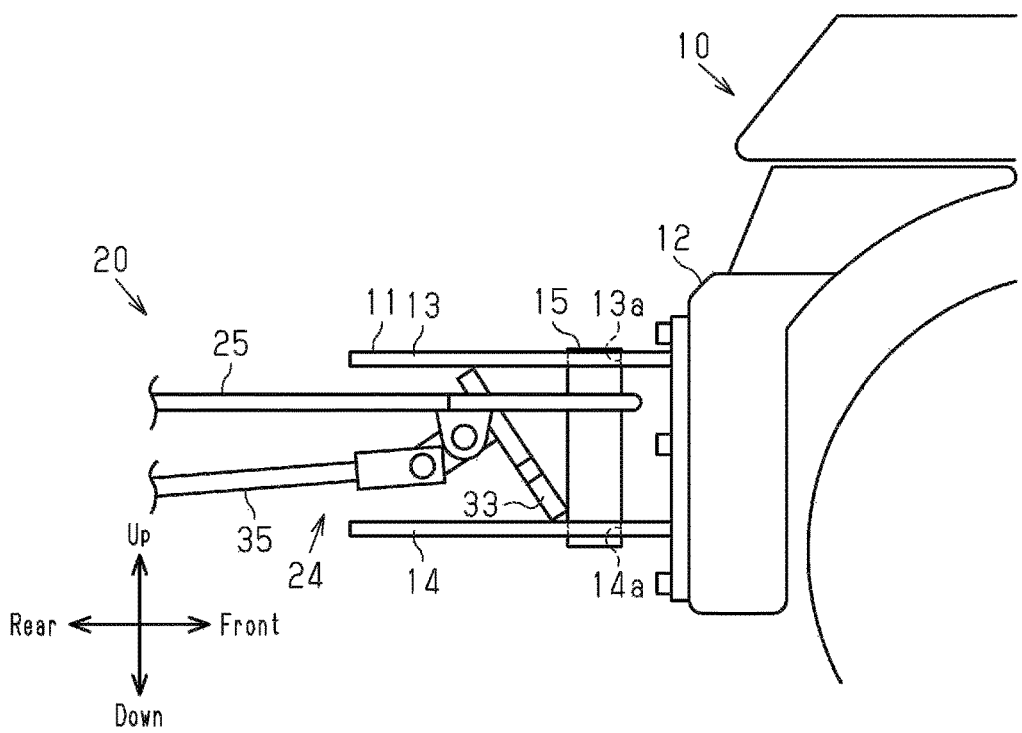
FIG. 2 is a side view of the portions coupling the dolly and the tractor.
Figure 3:
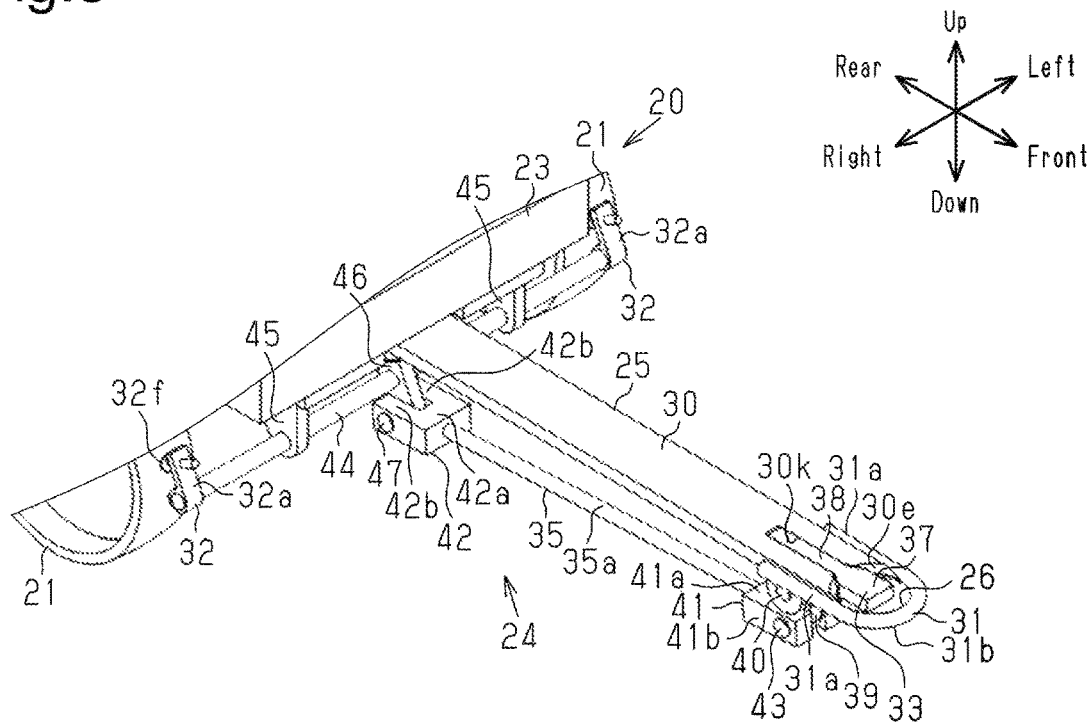
FIG. 3 is an enlarged perspective view of a towbar and a brake device and its surroundings.
Figure 4:
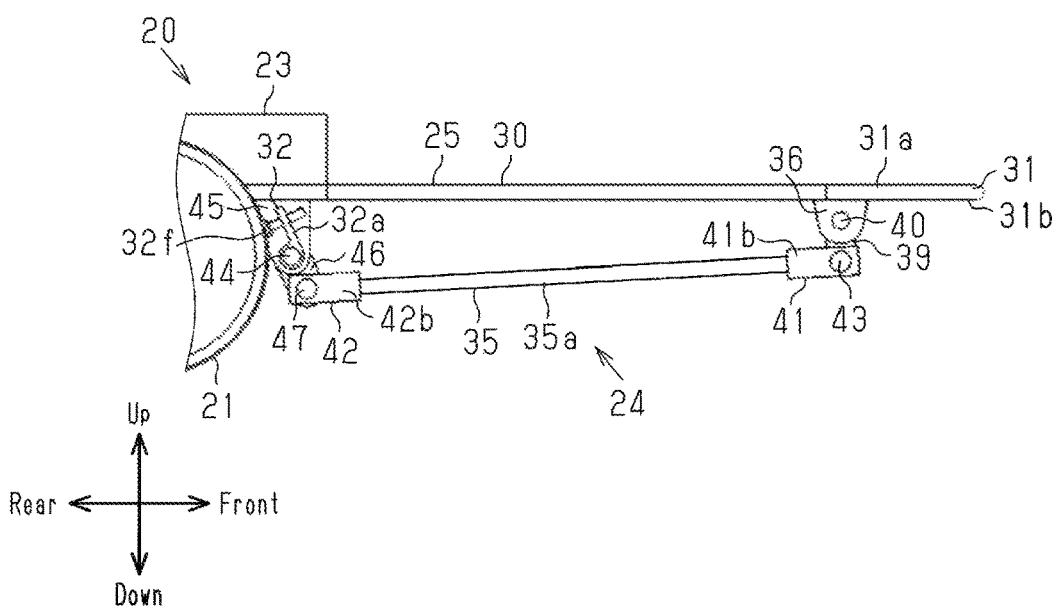
FIG. 4 is an enlarged side view of the towbar and the brake device and its surroundings.
Figure 5:
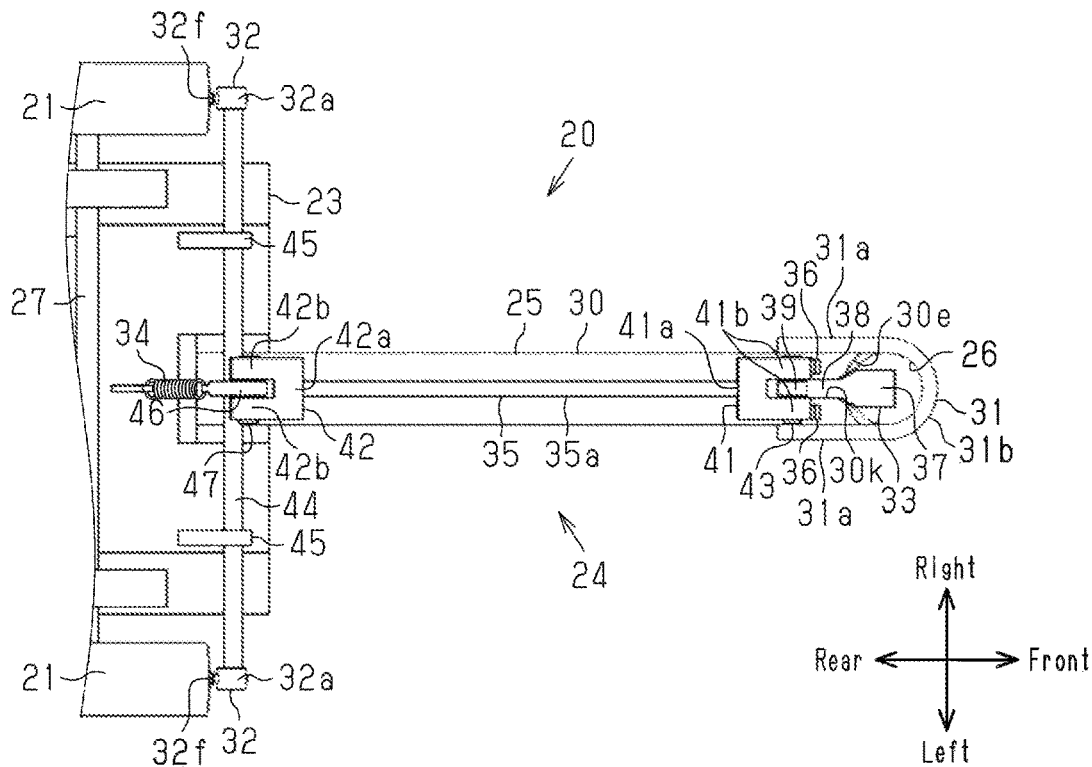
FIG. 5 is an enlarged lower view of the towbar and the brake device and its surroundings.
Figure 6:
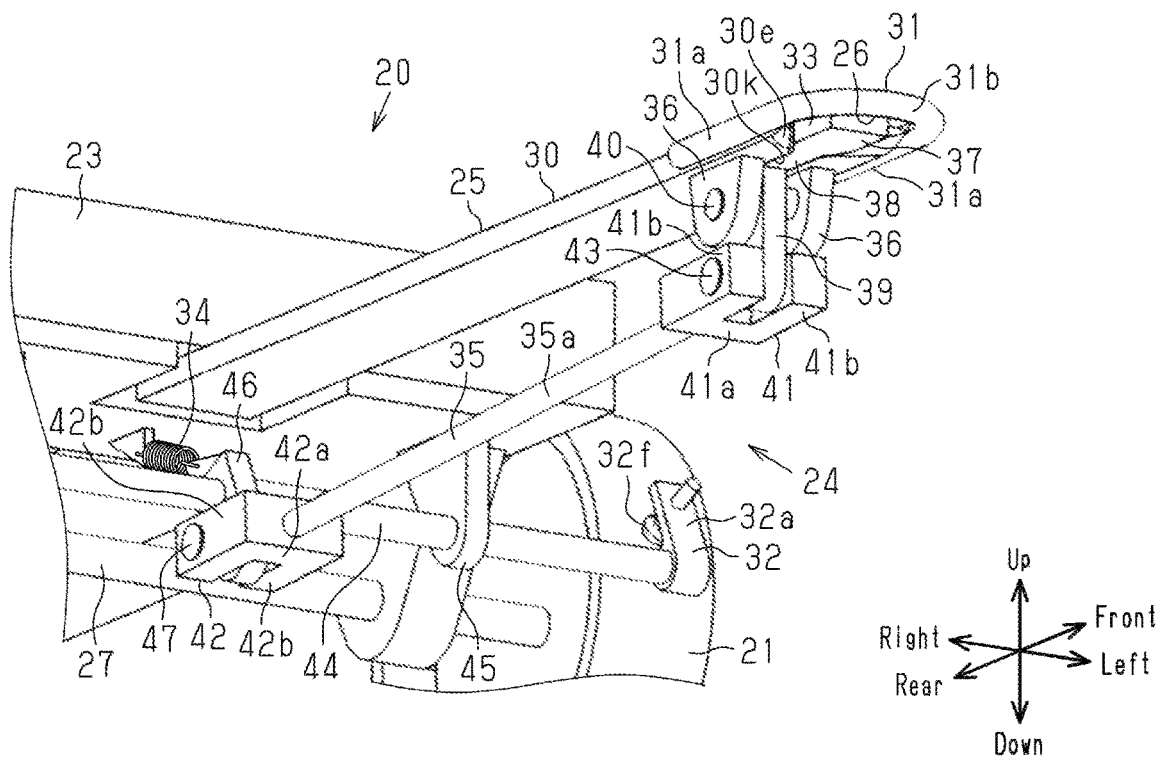
FIG. 6 is an enlarged perspective view of the towbar and the brake device and its surroundings.
Figure 7:
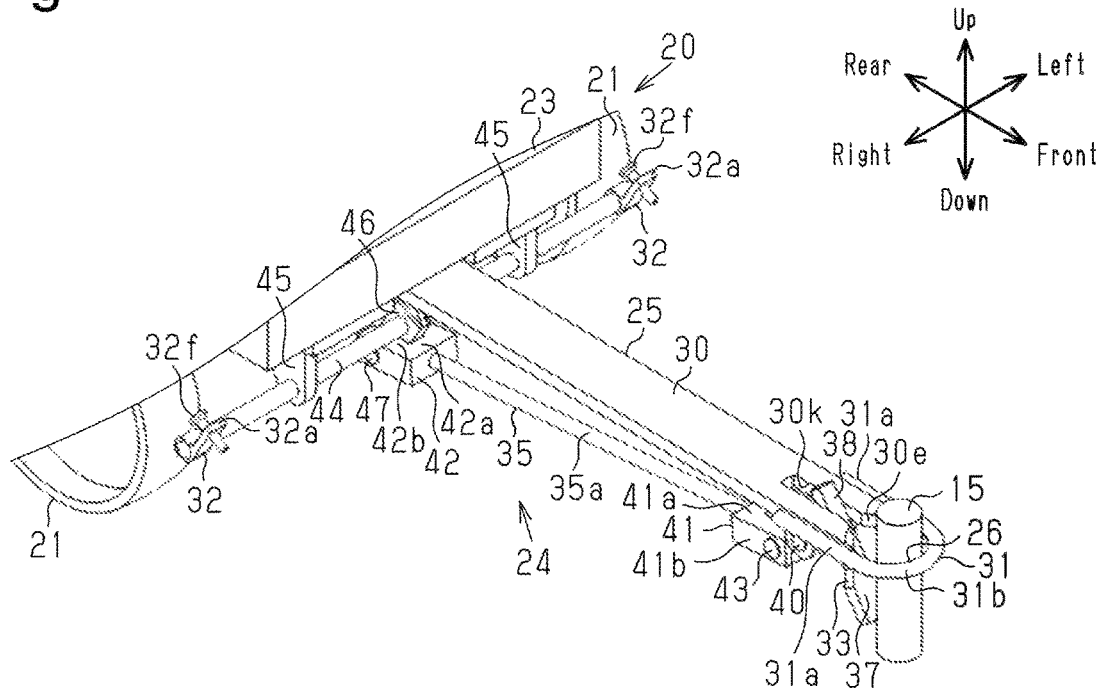
FIG. 7 is an enlarged perspective view of a drawbar inserted into a coupling hole.
Figure 8:
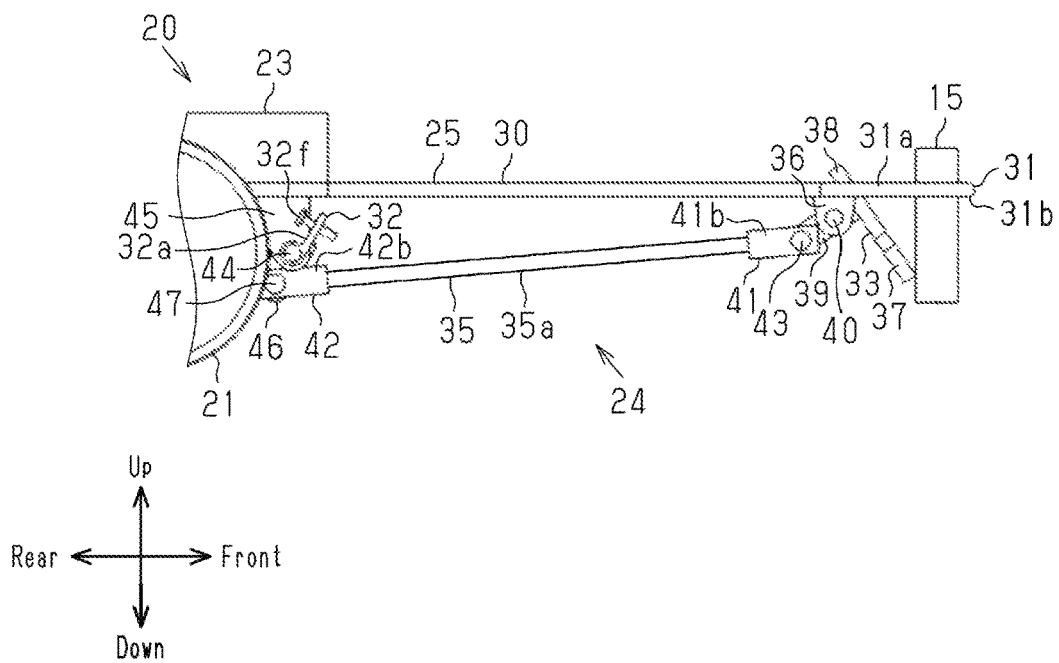
FIG. 8 is an enlarged side view of the drawbar inserted into the coupling hole.
Figure 9:
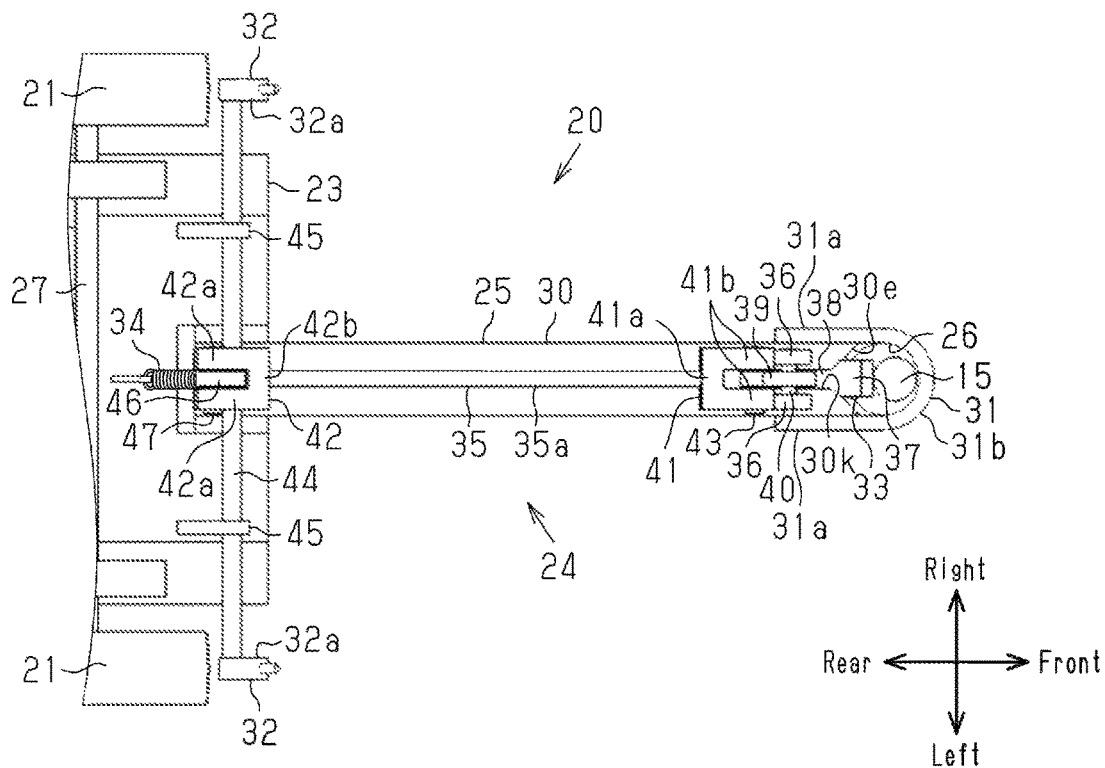
FIG. 9 is an enlarged lower view of the drawbar inserted into the coupling hole.
Figure 10:
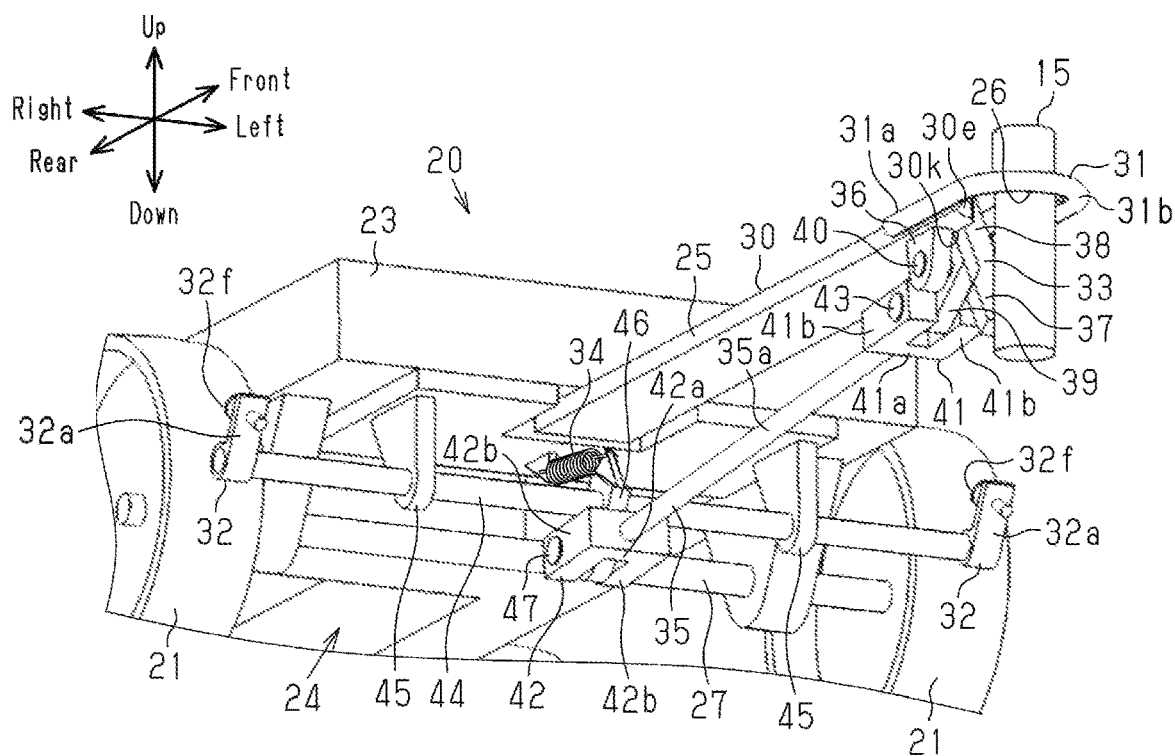
FIG. 10 is an enlarged perspective view of the drawbar inserted into the coupling hole.

As shown in FIGS. 1 and 2, a tractor 10 includes a body 12 and a towing bracket 11 arranged on a lower portion of the rear end of the body 12. The towing bracket 11 includes two plates, namely, a first plate 13 and a second plate 14. The first plate 13 and the second plate 14 are flat. The first plate 13 and the second plate 14 extend parallel to each other from the rear end of the body 12. The thickness-wise directions of each of the first plate 13 and the second plate 14 conform to the vertical direction.

The first plate 13 has a circular first attachment hole 13*a*. The first attachment hole 13*a* extends through the first plate 13 in the thickness-wise direction. The second plate 14 has a circular second attachment hole 14*a*. The second attachment hole 14*a* extends through the second plate 14 in the thickness-wise direction. The diameter of the first attachment hole 13*a* is the same as the diameter of the second attachment hole 14*a*. The first attachment hole 13*a* overlaps the second attachment hole 14*a* in the vertical direction. The axis of the first attachment hole 13a coincides with the axis of the second attachment hole 14a.

The first attachment hole 13a and the second attachment hole 14a allow for insertion of a drawbar 15. The drawbar 15 is cylindrical. When inserted into the first attachment hole 13a and the second attachment hole 14a, the drawbar 15 is attached to the first plate 13 and the second plate 14.

A dolly 20 includes two front wheels 21 and two rear wheels 22 corresponding to wheels. The dolly 20 also includes a load bed 23, a brake device 24, and a towbar 25. The brake device 24 applies a braking force to the two front wheels 21. The towbar 25 has a coupling hole 26 into which the drawbar 15 is inserted.

The towbar 25 is arranged between the first plate 13 and the second plate 14. The drawbar 15 is inserted from the upper side into the first attachment hole 13a, the coupling hole 26, and the second attachment hole 14a in this order. Thus, the towbar 25 is coupled to the towing bracket 11 via the drawbar 15. As described above, when the drawbar 15 is inserted into the coupling hole 26, the towbar 25 is coupled to the towing bracket 11 via the drawbar 15. Thus, the dolly 20 is towed by the tractor 10.

The two front wheels 21 are coupled to each other by an axle 27. The left front wheel 21 is coupled to a first end of the axle 27. The right front wheel 21 is coupled to a second end of the axle 27. The two front wheels 21 are rotationally supported by the load bed 23 via the axle 27. The two rear wheels 22 are coupled to each other by an axle 28. The left rear wheel 22 is coupled to a first end of the axle 28. The right rear wheel 22 is coupled to a second end of the axle 28. The two rear wheels 22 are rotationally supported by the load bed 23 via the axle 28.

As shown in FIGS. 3, 4, 5, and 6, the towbar 25 includes a towbar body 30 and a hole defining member 31 mounted on the towbar body 30. The towbar body 30 has a thin elongated rectangular shape. The towbar body 30 extends straight forward from a front end of the load bed 23. The longitudinal direction of the towbar body 30 conforms to the extension direction of the towbar body 30 from the front end of the load bed 23. The thickness-wise direction of the towbar body 30 conforms to the vertical direction. The lateral direction of the towbar body 30 conforms to the horizontal direction. The distal edge of the towbar body 30 is recessed toward the load bed 23 defining an arc-shaped hole defining edge 30e.

The hole defining member 31 includes two joining portions 31a and a joint 31b that joins the two joining portions 31a. The two joining portions 31a are joined to respective side edges of the distal end of the towbar body 30. The two joining portions 31a are rod-shaped and extend parallel to each other. The joint 31b is rod-shaped and extends from an end of each joining portion 31a located at the opposite side from the load bed 23. The joint 31b is arc-shaped and recessed in a direction away from the load bed 23.

The inner edge of the joint 31b is continuous with the two outermost edges of the hole defining edge 30e in the vicinity of the border with each joining portion 31a. The hole defining edge 30e and the inner edge of the joint 31b define the coupling hole 26 that is circular in plan view. The hole defining member 31 is mounted on the distal end of the towbar body 30 so that the coupling hole 26 is defined in cooperation with the hole defining edge 30e. The diameter of the coupling hole 26 is greater than the outer diameter of the drawbar 15.

The towbar body 30 includes a slit 30k extending straight from the hole defining edge 30e toward the load bed 23. The slit 30k has an elongated rectangular shape in plan view. The slit 30k is formed in the center of the hole defining edge 30e. More specifically, the slit 30k is formed in a portion of the hole defining edge 30e that is equidistant from the outermost edges. The slit 30k extends through the towbar body 30 in the thickness-wise direction.

The brake device 24 includes two braking portions 32 that apply braking forces to the two front wheels 21, a lever 33 that interlocks with the braking portions 32, and an urging spring 34 corresponding to an urging portion that urges the lever 33 and the two braking portions 32. The brake device 24 also includes a rod 35 that couples the two braking portions 32 to the lever 33.

The brake device 24 includes two first supports 36. The two first supports 36 are joined to the lower surface of the towbar body 30. The two first supports 36 are flat and project downward from the towbar body 30. The thickness-wise directions of the two first supports 36 conform to the lateral direction of the towbar body 30. The two first supports 36 are parallel to each other. The two first supports 36 are arranged on the lower surface of the towbar body 30 at opposite sides of the slit 30k.

The lever 33 includes a lever closure 37 configured to partially close the coupling hole 26, a lever continuation portion 38 continuous with the lever closure 37 and located inside the slit 30k, and a lever link 39 continuous with the lever continuation portion 38 and located between the two first supports 36. Each of the lever closure 37, the lever continuation portion 38, and the lever link 39 is flat. The lever closure 37, the lever continuation portion 38, and the lever link 39 are formed integrally with each other.

The thickness-wise direction of the lever closure 37 conforms to the thickness-wise direction of the lever continuation portion 38. When the coupling hole 26 is partially closed by the lever closure 37, the thickness-wise direction of the lever closure 37 and the thickness-wise direction of the lever continuation portion 38 conform to the thickness-wise direction of the towbar body 30. The thickness of the lever closure 37 is the same as the thickness of the lever continuation portion 38 and the thickness of the towbar body 30. The lever closure 37 has a greater width than the lever continuation portion 38.

The thickness-wise direction of the lever link 39 conforms to the lateral direction of the towbar body 30. The lever link 39 projects downward from the lower surface of the lever continuation portion 38. An end of the lever link 39 located at the opposite side from the lever continuation portion 38 is located at a lower position than the two first supports 36. The lever link 39 is pivotally supported by the two first supports 36 via a support shaft 40. The support shaft 40 extends through the lever link 39 and bridges the two first supports 36. The opposite ends of the support shaft 40 are respectively fixed to the two first supports 36. The lever 33 is pivotally supported by the two first supports 36 about the support shaft 40.

The rod 35 includes a rod body 35a, a first rod link 41 arranged on a first end of the rod body 35a, and a second rod link 42 arranged on a second end of the rod body 35a. The rod body 35a has an elongated cylindrical shape.

The first rod link 41 is U-shaped in plan view. The first rod link 41 includes a first connector 41a connected to the first end of the rod body 35a and two first extensions 41b extending from the first connector 41a. Each of the first connector 41a and the two first extensions 41b is elongated and flat. The thickness-wise direction of the first connector 41a conforms to the axial direction of the rod body 35a. The longitudinal direction of the first connector 41a conforms to the horizontal direction. The two first extensions 41b extend from opposite ends of the first connector 41a away from the rod body 35a. The thickness-wise directions of the two first extensions 41b conform to each other. The thickness-wise directions of the two first extensions 41b conform to the horizontal direction. The longitudinal directions of the two first extensions 41b conform to the axial direction of the rod body 35a. The two first extensions 41b are parallel to each other.

The two first extensions 41b are coupled to a lower end of the lever link 39 via a first coupling shaft 43. The lower end is an end of the lever link 39 located at the opposite side from the lever continuation portion 38. The first coupling shaft 43 extends through the lever link 39 and bridges the two first extensions 41b. The opposite ends of the first coupling shaft 43 are respectively fixed to the two first extensions 41b. The first coupling shaft 43 is slidable on the lever link 39.

The second rod link 42 is U-shaped in plan view. The second rod link 42 includes a second connector 42a connected to the second end of the rod body 35a and two second extensions 42b extending from the second connector 42a. Each of the second connector 42a and the two second extensions 42b is elongated and flat. The thickness-wise direction of the second connector 42a conforms to the axial direction of the rod body 35a. The longitudinal direction of the second connector 42a conforms to the horizontal direction. The two second extensions 42b extend from opposite ends of the second connector 42a away from the rod body 35a. The thickness-wise directions of the two second extensions 42b conform to each other. The thickness-wise directions of the two second extensions 42b conform to the horizontal direction. The longitudinal directions of the two second extensions 42b conform to the axial direction of the rod body 35a. The two second extensions 42b are parallel to each other.

The brake device 24 includes a rotation shaft 44 and two second supports 45. The rotation shaft 44 is rotationally supported by the load bed 23 via the two second supports 45. The two second supports 45 are thin and flat and project downward from the lower surface of the load bed 23. The thickness-wise directions of the two second supports 45 conform to the axial directions of the axles 27 and 28. The axial direction of the rotation shaft 44 conforms to the axial directions of the axles 27 and 28. The two second supports 45 are arranged at opposite sides of the basal end of the towbar body 30.

The rotation shaft 44 has a first end extending through the left second support 45 to the front of the left front wheel 21. The rotation shaft 44 has a second end extending through the right second support 45 to the front of the right front wheel 21.

A rotation shaft link 46 is fixed to the rotation shaft 44. The rotation shaft link 46 is thin and flat. The thickness-wise direction of the rotation shaft link 46 conforms to the axial direction of the rotation shaft 44. The rotation shaft 44 extends through the rotation shaft link 46. The rotation shaft link 46 is configured to pivot about the rotation shaft 44 in accordance with rotation of the rotation shaft 44. The rotation shaft link 46 is located at a position equidistant from the two second supports 45.

The two second extensions 42b are coupled to the rotation shaft link 46 via a second coupling shaft 47. The second coupling shaft 47 extends through the rotation shaft link 46 and bridges the two second extensions 42b. The opposite ends of the second coupling shaft 47 are respectively fixed to the two second extensions 42b. The second coupling shaft 47 is slidable on the rotation shaft link 46.

The urging spring 34 is an extension coil spring. The urging spring 34 has a first end supported by the load bed 23. The urging spring 34 has a second end supported by a portion of the rotation shaft link 46 located at the opposite side from the second rod link 42. The urging spring 34 urges the rotation shaft link 46 in a direction in which the rotation shaft link 46 is pulled Each braking portion 32 includes an attachment portion 32a attached to the rotation shaft 44 and a pressing portion 32f attached to the attachment portion 32a. The pressing portion 32f is formed of rubber. The attachment portion 32a is elongated and thin. As viewed in the axial direction of the rotation shaft 44, a portion of the attachment portion 32a and the second rod link 42 extend from opposite sides of the rotation shaft 44. The attachment portion 32a of one of the two braking portions 32 is attached to the first end of the rotation shaft 44. Hence, the pressing portion 32f of the one of the two braking portions 32 is located at the front of the left front wheel 21. The attachment portion 32a of the other one of the two braking portions 32 is attached to the second end of the rotation shaft 44. Hence, the pressing portion 32f of the other one of the two braking portions 32 is located at the front of the right front wheel 21. The two braking portions 32 are configured to pivot about the rotation shaft 44 in accordance with rotation of the rotation shaft 44. Thus, the pressing portions 32f of the braking portions 32 are configured to contact and separate from the respective front wheels 21.

The operation of the first embodiment will now be described.

When the drawbar 15 is removed from the coupling hole 26, the tractor 10 is uncoupled from the towbar 25. An urging force of the urging spring 34 that pulls the rotation shaft link 46 is applied to the rotation shaft link 46. This causes the rotation shaft link 46 to pivot about the rotation shaft 44 so that the pressing portions 32f of the braking portions 32 move toward the front wheels 21. Thus, the rotation shaft 44 rotates integrally with the rotation shaft link 46. The urging force of the urging spring 34 is transmitted to the braking portions 32 through the rotation shaft link 46 and the rotation shaft 44 to press the pressing portions 32f of the braking portions 32 against the front wheels 21. As described above, when the pressing portions 32f of the braking portions 32 are pressed against the front wheels 21 by the urging force of the urging spring 34, braking forces are applied to the front wheels 21. This switches to the braking state in which braking forces are applied to the front wheels 21. Thus, the braking portions 32 are pressed against the front wheels 21 to apply braking forces to the front wheels 21.

In addition, when the rotation shaft 44 is rotated integrally with the rotation shaft link 46 by the urging spring 34, the rotation shaft link 46 urges the second rod link 42 via the second coupling shaft 47 so that the second rod link 42 moves toward the two first supports 36. As a result, the first rod link 41 urges the lever link 39 via the first coupling shaft 43. This pivots the lever link 39 about the support shaft 40 so that the lever closure 37 moves toward the coupling hole 26. Thus, the urging force of the urging spring 34 is transmitted to the lever 33 through the rotation shaft link 46, the second coupling shaft 47, the second rod link 42, the rod body 35a, the first rod link 41, and the first coupling shaft 43. As a result, the lever closure 37 partially closes the coupling hole 26.

As described above, when the drawbar 15 is removed from the coupling hole 26, the lever 33 is urged by the urging spring 34 to partially close the coupling hole 26, and the braking portions 32 are urged by the urging spring 34 to switch to the braking state.

As shown in FIGS. 1, 2, 7, 8, 9, and 10, after passing through the first plate 13 of the towing bracket 11, the drawbar 15 pushes out the lever closure 37, which closes the coupling hole 26, and is inserted into the coupling hole 26. Then, the drawbar 15 is inserted into the second plate 14 of the towing bracket 11, so that the towbar 25 is coupled to the towing bracket 11 via the drawbar 15. As a result, the tractor 10 is capable of towing the dolly 20.

When the drawbar 15 is inserted into the coupling hole 26, the lever link 39 rotates about the support shaft 40 so that the lever closure 37, which closes the coupling hole 26, moves away from the coupling hole 26. The lever link 39 urges the first rod link 41 via the first coupling shaft 43, and the second rod link 42 moves away from the two first supports 36 via the rod body 35a. Thus, the second rod link 42 urges the rotation shaft link 46 via the second coupling shaft 47. The rotation shaft link 46 pivots about the rotation shaft 44 so that the pressing portions 32f of the braking portions 32 move away from the front wheels 21 against the urging force of the urging spring 34 that pulls the rotation shaft link 46. The rotation shaft 44 rotates integrally with the rotation shaft link 46, and the pressing portions 32f of the braking portions 32 move away from the front wheels 21. This switches to the non-braking state in which the front wheels 21 are released from the braking forces. The braking portions 32 interlock with the lever 33 via the rod 35.

As described above, as the drawbar 15 moves the lever 33, which closes the coupling hole 26, against the urging force of the urging spring 34, the drawbar 15 is inserted into the coupling hole 26. The braking portions 32 interlock with the lever 33 against the urging force of the urging spring 34, thereby switching to the non-braking state. Therefore, the brake device 24 is configured to switch from the braking state, in which braking forces are applied to the front wheels 21, to the non-braking state, in which the front wheels 21 are released from the braking forces, when the drawbar 15 is inserted into the coupling hole 26, and switch from the non-braking state to the braking state when the drawbar 15 is removed from the coupling hole 26.

The first embodiment obtains the following advantages.

(1) When the drawbar 15 is inserted into the coupling hole 26, the brake device 24 switches from the braking state, in which braking forces are applied to the front wheels 21, to the non-braking state, in which the front wheels 21 are released from the braking forces. When the drawbar 15 is removed from the coupling hole 26, the brake device 24 switches from the non-braking state to the braking state. Inserting the drawbar 15 into the coupling hole 26 of the towbar 25 is a necessary task to couple the towbar 25 to the tractor 10. Insertion of the drawbar 15 into the coupling hole 26 switches from the braking state, in which braking forces are applied to the front wheels 21, to the non-braking state, in which the front wheels 21 are released from the braking forces. This eliminates the need for a task for only switching from the braking state to the non-braking state. Also, removing the drawbar 15 from the coupling hole 26 is a necessary task to uncouple the tractor 10 from the towbar 25. Removal of the drawbar 15 from the coupling hole 26 switches from the non-braking state to the braking state. This eliminates the need for a task for only switching from the non-braking state to the braking state, thereby improving the work efficiency.

(2) When the drawbar 15 is removed from the coupling hole 26, the lever 33 is urged by the urging spring 34 to partially close the coupling hole 26, and the braking portions 32 are urged by the urging spring 34 to switch to the braking state. In addition, when the drawbar 15 is inserted into the coupling hole 26 as the drawbar 15 moves the lever 33, which closes the coupling hole 26, against the urging force of the urging spring 34, the braking portions 32 interlock with the lever 33 against the urging force of the urging spring 34 to switch to the non-braking state. That is, a switch to the non-braking state is accomplished by simply inserting the drawbar 15 into the coupling hole 26 as the lever 33, which closes the coupling hole 26, is moved against the urging force of the urging spring 34. Also, by simply removing the drawbar 15 from the coupling hole 26, the lever 33 is urged by the urging spring 34 to partially close the coupling hole 26, and the braking portions 32 are urged by the urging spring 34 to switch to the braking state.

(3) The brake device 24 includes the rod 35 that couples the braking portions 32 to the lever 33. The braking portions 32 interlock with the lever 33 via the rod 35. With this configuration, even when the coupling hole 26 of the towbar 25 is located away from the braking portions 32, the braking portions 32 interlock with the lever 33 via the rod 35. This eliminates the need for extension of the lever 33 toward the braking portions 32 so that the braking portions 32 interlock with the lever 33. A lever 33 having the same size may be used regardless of the position of the coupling hole 26 in the towbar 25 and the layout positions of the braking portions 32.

(4) The braking portions 32 are pressed against the front wheels 21 to apply braking forces to the front wheels 21. This configuration is suitable for applying braking forces to the front wheels 21.

Second Embodiment

A second embodiment of a dolly will be described below in accordance with FIGS. 11 and 12. In the second embodiment, the same reference numerals are given to those components that are the same as the corresponding components of the first embodiment to omit or simplify the overlapping description. In the second embodiment, a torsion coil spring is used as an urging spring instead of the extension coil spring described in the first embodiment.

Figure 11:
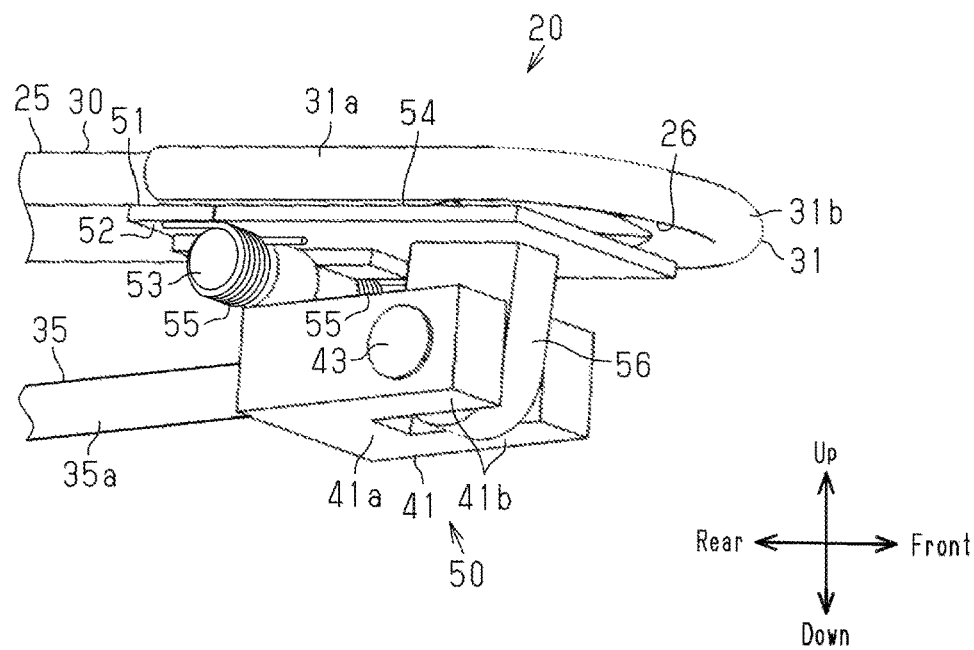
FIG. 11 is an enlarged perspective view of a brake device and its surroundings in a second embodiment.
Figure 12:
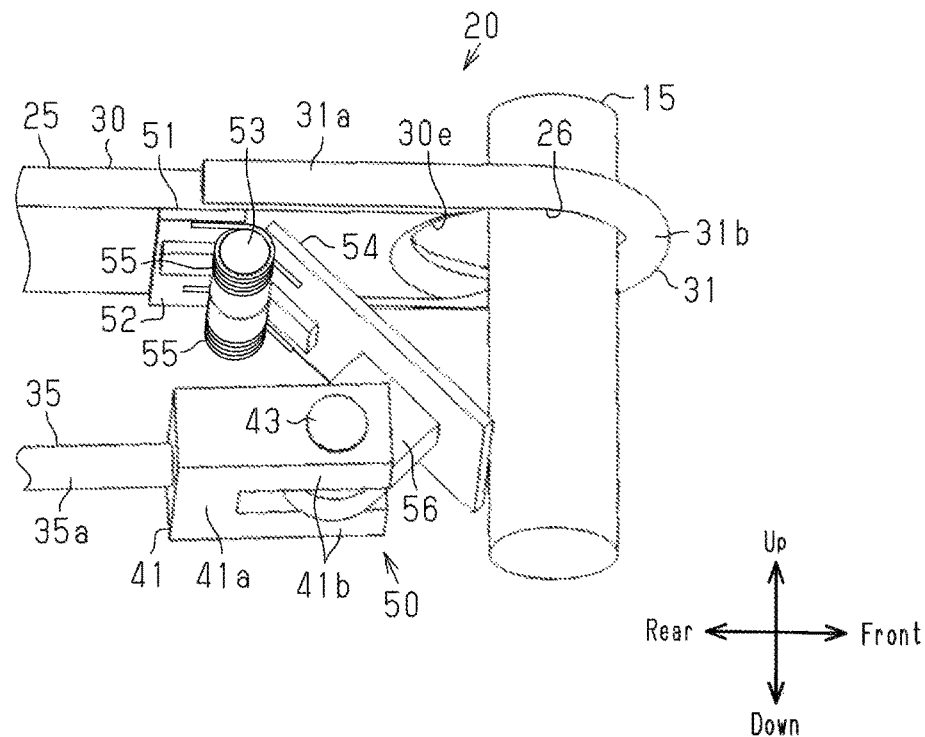
FIG. 12 is an enlarged perspective view of a drawbar inserted into a coupling hole.

As shown in FIGS. 11 and 12, a brake device 50 includes a hinge 51. The hinge 51 is coupled to a lower surface of the towbar body 30. The hinge 51 includes a hinge attachment plate 52 that is thin and flat, a hinge support shaft 53 supported by the hinge attachment plate 52, and a lever 54 that is elongated, thin, and flat. The hinge attachment plate 52 is coupled to the lower surface of the towbar body 30. The lever 54 is pivotally supported by the hinge support shaft 53 about the hinge support shaft 53. Two urging springs 55, which are torsion coil springs, are attached to the hinge support shaft 53. Each urging spring 55 has a first end supported by the hinge attachment plate 52 and a second end supported by the lever 54. The urging spring 55 urges the lever 54 so that the lever 54 pivots toward the coupling hole 26. The lever 54 is configured to partially close the coupling hole 26.

A link 56 is arranged on the lower surface of the lever 54. The link 56 is coupled to the first rod link 41 via the first coupling shaft 43. Although not shown in the drawings, the urging spring 34, which is described in the first embodiment, is not arranged on the portion of the rotation shaft link 46 located at the opposite side from the portion of the rotation shaft link 46 coupled to the second rod link 42. The other configurations are the same as the configurations of the brake device 24 described in the first embodiment and thus will not be described in detail.

The operation of the second embodiment will now be described.

As shown in FIG. 11, when the drawbar 15 is removed from the coupling hole 26, the tractor 10 is uncoupled from the towbar 25. The urging springs 55 urge the lever 54 so that the lever 54 pivots toward the coupling hole 26 about the hinge support shaft 53. The lever 54 moves toward the coupling hole 26 and partially closes the coupling hole 26.

Also, the link 56 moves the first rod link 41 toward the coupling hole 26 via the first coupling shaft 43. The rod body 35a and the second rod link 42 move toward the coupling hole 26, and the second rod link 42 pivots the rotation shaft link 46 about the rotation shaft 44 via the second coupling shaft 47 so that the pressing portions 32f of the braking portions 32 move toward the front wheels 21. As a result, the rotation shaft 44 rotates integrally with the rotation shaft link 46, and the pressing portions 32f of the braking portions 32 are pressed against the front wheels 21.

Thus, the urging forces of the two urging springs 55 are transmitted to the braking portions 32 through the lever 54, the link 56, the first coupling shaft 43, the first rod link 41, the rod body 35a, the second rod link 42, the second coupling shaft 47, the rotation shaft link 46, and the rotation shaft 44. As a result, the pressing portions 32f of the braking portions 32 are pressed against the front wheels 21. As described above, when the pressing portions 32f of the braking portions 32 are pressed against the front wheels 21 by the urging forces of the urging springs 55, braking forces are applied to the front wheels 21. This forms the braking state in which the brake device 50 applies braking forces to the front wheels 21.

Thus, when the drawbar 15 is removed from the coupling hole 26, the lever 54 is urged by the urging springs 55 to partially close the coupling hole 26, and the braking portions 32 are urged by the urging springs 55 to switch to the braking state.

As shown in FIG. 12, after passing through the first plate 13 of the towing bracket 11, the drawbar 15 pushes out the lever 54, which closes the coupling hole 26, and is inserted into the coupling hole 26. After passing through the coupling hole 26, the drawbar 15 is inserted into the second plate 14 of the towing bracket 11. Thus, the towbar 25 is coupled to the towing bracket 11 via the drawbar 15. As a result, the tractor 10 is capable of towing the dolly 20.

When the drawbar 15 is inserted into the coupling hole 26, the lever 54, which closes the coupling hole 26, pivots about the hinge support shaft 53 to move away from the coupling hole 26 against the urging forces of the urging springs 55. The link 56 urges the first rod link 41 away from the coupling hole 26 via the first coupling shaft 43. As a result, the rod body 35a and the second rod link 42 move away from the coupling hole 26. The second rod link 42 pivots the rotation shaft link 46 about the rotation shaft 44 via the second coupling shaft 47 so that the pressing portions 32f of the braking portions 32 move away from the front wheels 21. As a result, the rotation shaft 44 rotates integrally with the rotation shaft link 46, and the pressing portions 32f of the braking portions 32 move away from the front wheels 21. This forms the non-braking state in which the front wheels 21 are released from the braking forces of the brake device 50. The second embodiment obtains the same advantages (1), (2), (3), and (4) of the first embodiment.

Third Embodiment

A third embodiment of a dolly will now be described in accordance with FIGS. 13 and 14. The third embodiment differs from the first embodiment in that a lever configuring a brake device slides.

Figure 13:
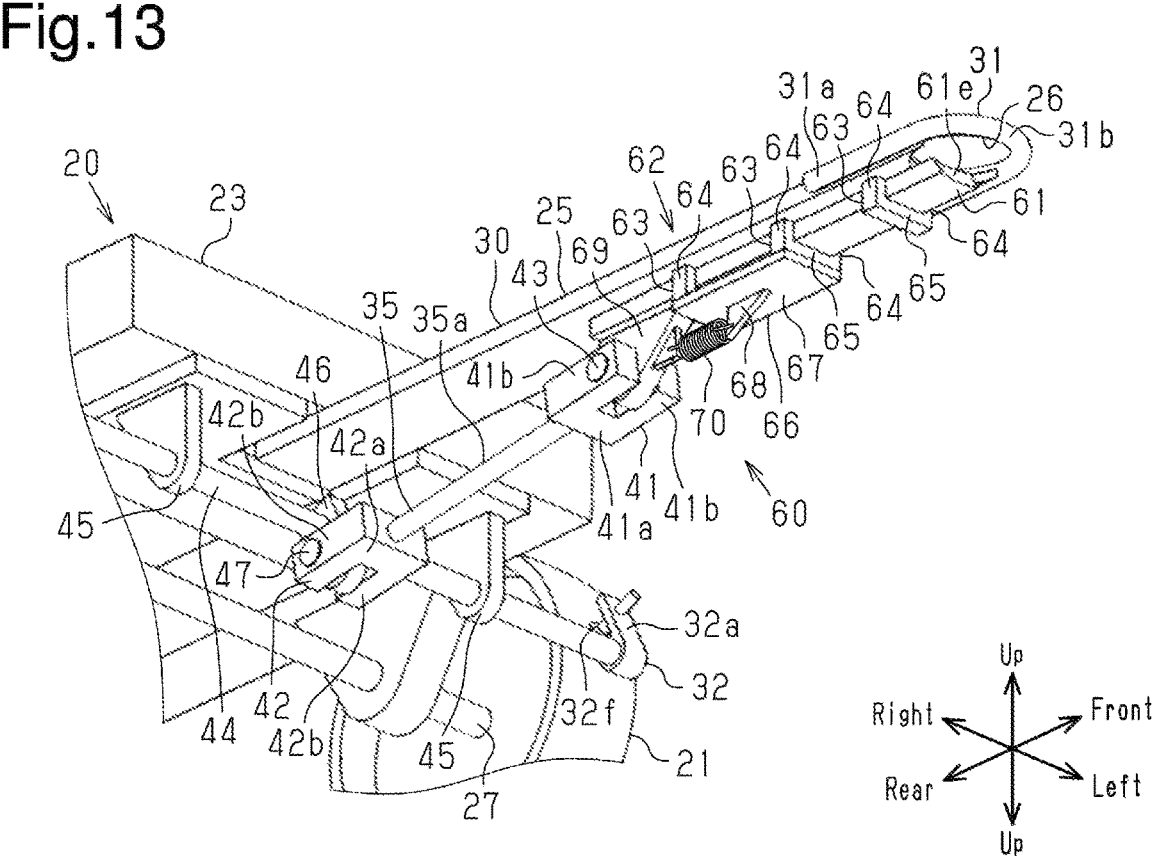
FIG. 13 is an enlarged perspective view of a brake device and its surroundings in a third embodiment.
Figure 14:
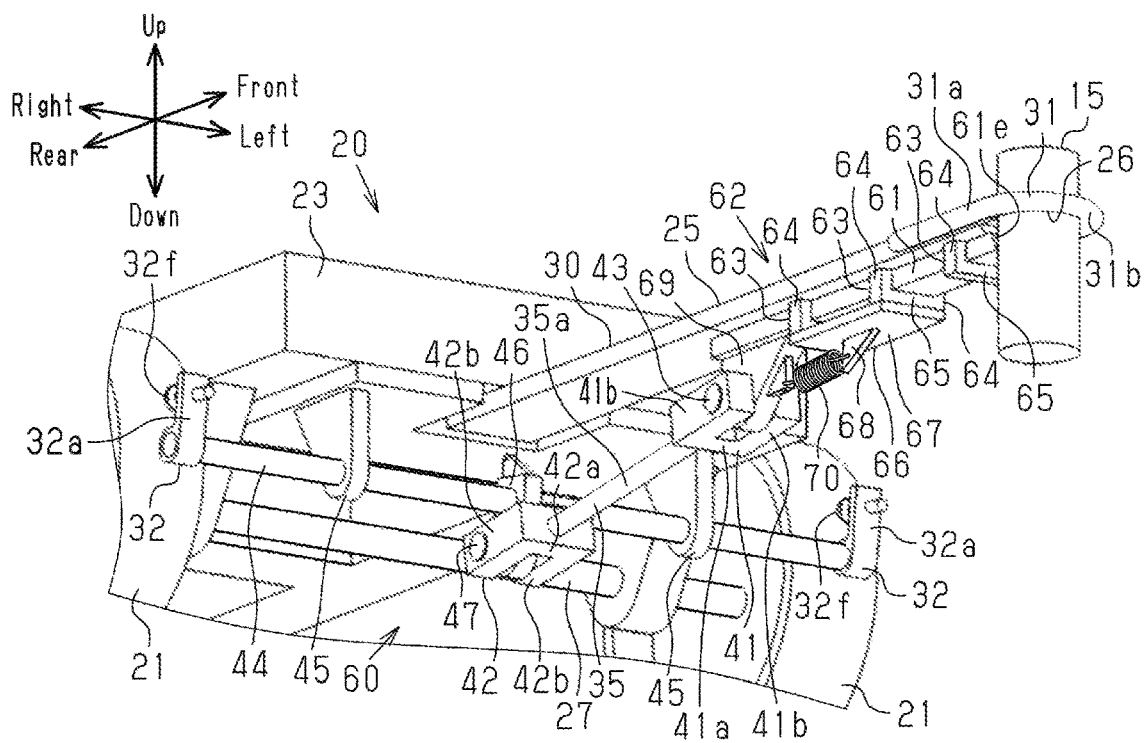
FIG. 14 is an enlarged perspective view of a drawbar inserted into a coupling hole.

As shown in FIGS. 13 and 14, a brake device 60 includes a guide mechanism 62 that guides a lever 61 in the horizontal direction. The lever 61 extends along the lower surface of the towbar body 30 and has an elongated thin flat shape. The guide mechanism 62 includes three guides 63 attached to the lower surface of the towbar body 30. The guides 63 are arranged at equal intervals in the longitudinal direction of the towbar body 30. Each guide 63 includes two posts 64 arranged on the lower surface of the towbar body 30 and a connector 65 connecting the distal ends of the two posts 64. The two posts 64 are spaced apart from each other in the lateral direction of the towbar body 30. The two posts 64 are tetragonal-rod-shaped and extend parallel to each other. Each connector 65 is tetragonal-rod-shaped and extends parallel to the lower surface of the towbar body 30 in the lateral direction of the towbar body 30.

The lever 61 is inserted into the inside of each guide 63 and arranged along the lower surface of the towbar body 30. The lever 61 is guided by the guides 63 to slide in the horizontal direction. The longitudinal direction of the lever 61 conforms to the longitudinal direction of the towbar body 30. The lever 61 has a first end configured to partially close the coupling hole 26.

The brake device 60 includes a spring support 66. The spring support 66 includes a base 67 having a thin and flat rectangular shape and a projection 68 extending from the base 67. The base 67 connects the connectors 65 of two of the three guides 63 that are located closer to the load bed 23. The thickness-wise direction of the base 67 conforms to the thickness-wise direction of the towbar body 30. The projection 68 extends from a surface of the base 67 located at the opposite side from the towbar body 30.

The first end of the lever 61 has an arc-shaped edge that is recessed toward a second end of the lever 61. The edge of the first end of the lever 61 defines an inclined surface 61e that gradually extends away from the second end of the lever 61 at positions farther from the lower surface of the towbar body 30. A link 69 is arranged on the lower surface of the lever 61 in the vicinity of the second end.

The brake device 60 includes an urging spring 70 serving as an urging portion. The urging spring 70 is an extension coil spring. The urging spring 70 has a first end supported by the projection 68 and a second end supported by the link 69. The urging spring 70 urges the link 69 in a direction in which the link 69 is pulled. The lever 61 is urged by the urging spring 70 to slide toward the coupling hole 26.

The link 69 is coupled to the first rod link 41 via the first coupling shaft 43. The urging spring 34, which is described in the first embodiment, is not arranged on the portion of the rotation shaft link 46 located at the opposite side from the portion of the rotation shaft link 46 coupled to the second rod link 42. The other configurations are the same as the configurations of the brake device 24 described in the first embodiment and thus will not be described in detail.

The operation of the third embodiment will now be described.

As shown in FIG. 13, when the drawbar 15 is removed from the coupling hole 26, the tractor 10 is uncoupled from the towbar 25. The urging spring 70 urges the link 69 in a direction in which the link 69 is pulled. That is, the lever 61 is urged by the urging spring 70 to slide toward the coupling hole 26. Thus, when the drawbar 15 is removed from the coupling hole 26, the lever 61 moves toward the coupling hole 26 and partially closes the coupling hole 26.

In addition, since the link 69 is pulled by the urging spring 70, the link 69 moves the first rod link 41 via the first coupling shaft 43 toward the coupling hole 26. The rod body 35a and the second rod link 42 move toward the coupling hole 26, and the second rod link 42 pivots the rotation shaft link 46 about the rotation shaft 44 via the second coupling shaft 47 so that the pressing portions 32f of the braking portions 32 move toward the front wheels 21. As a result, the rotation shaft 44 rotates integrally with the rotation shaft link 46, and the pressing portions 32f of the braking portions 32 are pressed against the front wheels 21.

Thus, the urging force of the urging spring 70 is transmitted to the braking portions 32 through the link 69, the first coupling shaft 43, the first rod link 41, the rod body 35a, the second rod link 42, the second coupling shaft 47, the rotation shaft link 46, and the rotation shaft 44. As a result, the pressing portions 32f of the braking portions 32 are pressed against the front wheels 21. As described above, when the pressing portions 32f of the braking portions 32 are pressed against the front wheels 21 by the urging forces of the urging spring 70, braking forces are applied to the front wheels 21. This forms the braking state in which the brake device 60 applies braking forces to the front wheels 21.

Thus, when the drawbar 15 is removed from the coupling hole 26, the lever 61 is urged by the urging spring 70 to partially close the coupling hole 26, and the braking portions 32 are urged by the urging spring 70 to switch to the braking state.

As shown in FIG. 14, after passing through the first plate 13 of the towing bracket 11, the drawbar 15 is inserted into the coupling hole 26 in contact with the inclined surface 61e of the lever 61, which closes the coupling hole 26. As a result, the lever 61, which closes the coupling hole 26, slides away from the coupling hole 26 against urging force of the urging spring 70. After passing through the coupling hole 26, the drawbar 15 is inserted into the second plate 14 of the towing bracket 11. Thus, the towbar 25 is coupled to the towing bracket 11 via the drawbar 15. As a result, the tractor 10 is capable of towing the dolly 20.

When the drawbar 15 is inserted into the coupling hole 26, the lever 61, which closes the coupling hole 26, slides away from the coupling hole 26 against the urging force of the urging spring 70. The link 69 urges the first rod link 41 away from the coupling hole 26 via the first coupling shaft 43. As a result, the rod body 35a and the second rod link 42 move away from the coupling hole 26. The second rod link 42 pivots the rotation shaft link 46 about the rotation shaft 44 via the second coupling shaft 47 so that the pressing portions 32f of the braking portions 32 move away from the front wheels 21. As a result, the rotation shaft 44 rotates integrally with the rotation shaft link 46, and the pressing portions 32f of the braking portions 32 move away from the front wheels 21. This forms the non-braking state in which the front wheels 21 are released from the braking force of the brake device 60. The third embodiment obtains the same advantages (1), (2), (3), and (4) of the first embodiment.

The above-described embodiments may be modified as follows. The above-described embodiments and the following modified examples can be combined as long as the combined modified examples remain technically consistent with each other.

The braking portions 32 may be pressed against the axle 27 to apply braking forces to the front wheels 21.

The brake devices 24, 50, and 60 may be configured to apply braking forces to the two rear wheels 22. In this case, the braking portions may be pressed against the rear wheels 22 to apply braking forces to the rear wheels 22 or may be pressed against the axle 28 to apply braking forces to the rear wheels 22.

When the drawbar 15 is removed from the coupling hole 26, the levers 33, 54, and 61 may be urged by the urging springs 34, 55, and 70 to entirely close the coupling hole 26. It may be configured so that the levers 33, 54, and 61 are urged by the urging springs 34, 55, and 70 to at least partially close the coupling hole 26.

The rod 35 may be omitted from the brake devices 24, 50, and 60. In this case, the levers 33, 54, and 61 may extend toward the braking portions 32 and be directly coupled to the braking portions 32.

In the brake devices 24, 50, and 60, the urging springs 34, 55, and 70 are used as the urging portions. However, elastic members other than springs such as rubber members may be used as long as the elastic members are configured to urge the levers 33, 54, and 61 and the braking portions 32.

Drum brakes may be incorporated in respective wheel members of the front wheels 21 and used as the braking portions. In this case, when the rod 35 is urged by urging portions, brake shoes of the drum brakes expand to apply braking forces to the front wheels 21.

The brake devices 24, 50, and 60 may include a sensor that detects insertion of the drawbar 15 into the coupling hole 26 and a controller that receives information detected by the sensor. The brake devices 24, 50, and 60 may be configured to switch from the braking state, in which braking forces are applied to the front wheels 21, to the non-braking state, in which the front wheels 21 are released from the braking forces, when the controller receives information from the sensor, and switch from the non-braking state to the braking state when the controller does not receive information from the sensor.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A dolly configured to be towed by a tractor, the dolly comprising:
a wheel;
a brake device that applies a braking force to the wheel; and
a towbar including a coupling hole into which a drawbar of the tractor is downwardly inserted, wherein
when the drawbar is downwardly inserted into the coupling hole, the dolly is coupled to the tractor via the towbar and the drawbar, and
the brake device is configured to switch from a braking state in which a braking force is applied to the wheel to a non-braking state in which the wheel is released from the braking force when the drawbar is downwardly inserted into the coupling hole, and to switch from the non-braking state to the braking state when the drawbar is removed from the coupling hole, wherein the brake device includes
- a braking portion that applies a braking force to the wheel,
- a lever that interlocks with the braking portion, and
- an urging portion that urges the lever and the braking portion, the brake device is configured so that when the drawbar is removed from the coupling hole, the lever is urged by the urging portion to at least partially close the coupling hole and the braking portion is urged by the urging portion to switch to the braking state, and the brake device is configured so that when the drawbar moves the lever, which closes the coupling hole, against an urging force of the urging portion and is inserted into the coupling hole, the braking portion interlocks with the lever against the urging force of the urging portion to switch to the non-braking state.

2. The dolly according to claim 1, wherein
the brake device further includes a rod coupling the braking portion to the lever, and
the braking portion and the lever are configured to interlock with each other via the rod.

3. The dolly according to claim 1, wherein the braking portion is configured to be pressed against the wheel to apply a braking force to the wheel.

* * * * *